United States Patent [19]

Becker

[11] E Re. 29,874

[45] Reissued Jan. 2, 1979

[54] ELECTROPLATING OF THE CUT EDGES OF SHEET METAL PANELS

[76] Inventor: Otto A. Becker, Robert Koch Strasse 9, 66 Saarbruecken, Fed. Rep. of Germany

[21] Appl. No.: 843,113

[22] Filed: Oct. 17, 1977

Related U.S. Patent Documents

Reissue of:

[64] Patent No.: 3,907,649
Issued: Sep. 23, 1975
Appl. No.: 397,257
Filed: Sep. 14, 1973

U.S. Applications:

[63] Continuation of Ser. No. 204,390, Dec. 2, 1971, abandoned, which is a continuation of Ser. No. 835,116, Jun. 20, 1969, abandoned.

[30] Foreign Application Priority Data

Jun. 20, 1968 [DE] Fed. Rep. of Germany ..... 1771645
Aug. 1, 1968 [DE] Fed. Rep. of Germany ..... 1771933
Oct. 17, 1968 [DE] Fed. Rep. of Germany ..... 1803474

[51] Int. Cl.[2] ..... C25D 5/02; C25D 5/06; C25D 7/06

[52] U.S. Cl. ..... 204/15; 204/224 R

[58] Field of Search ..... 204/15, 25, 27, 194, 204/224

[56] References Cited

U.S. PATENT DOCUMENTS

| | | | |
|---|---|---|---|
| 1,739,657 | 12/1929 | Shemitz | 204/224 R |
| 2,367,159 | 1/1945 | Van Der Horst | 204/25 |
| 2,436,227 | 2/1949 | Phillips | 204/25 |
| 2,846,379 | 8/1958 | Chambers et al. | 204/25 |
| 3,051,633 | 8/1962 | Paull et al. | 204/25 |
| 3,259,556 | 7/1966 | De Nault | 204/15 |

*Primary Examiner*—T. M. Tufariello
*Attorney, Agent, or Firm*—Beall & Jeffery

[57] ABSTRACT

Electroplating of the unprotected cut edges of sheet metal panels coated with an electrically non-conductive protective coating as said edges are formed on cutting the panels to shape, is effected in a highly economical manner by forming a pile of said panels so that the cut edge portions of said panels are substantially aligned with the edge portion of the electrically non-conductive protective coating, bringing at least one side face of said pile with the cut edges in contact with the electroplating electrolyte, connecting each single panel to an electroplating current source, and electroplating the cut edges of each panel. Sheet metal panels without coating or with an electrically conductive coating are electroplated in the described manner by interposing electrically non-conductive layers between the sheet metal panels at least at their margins to prevent penetration of the electrolyte between the panels and conductive contact of the panels with each other.

16 Claims, 18 Drawing Figures

64
63
49
53
50
48
41
42
43
1a
47
18
41
62
17
1
45
46
53
61a
25
61
16
42
44
61
41
50
49
62a
53
10

49
50
48
43
41
42
53
47
44
44a
17
50
49
46
51
52
41
42
44
44a
48
53
54
50
49

Fig.13
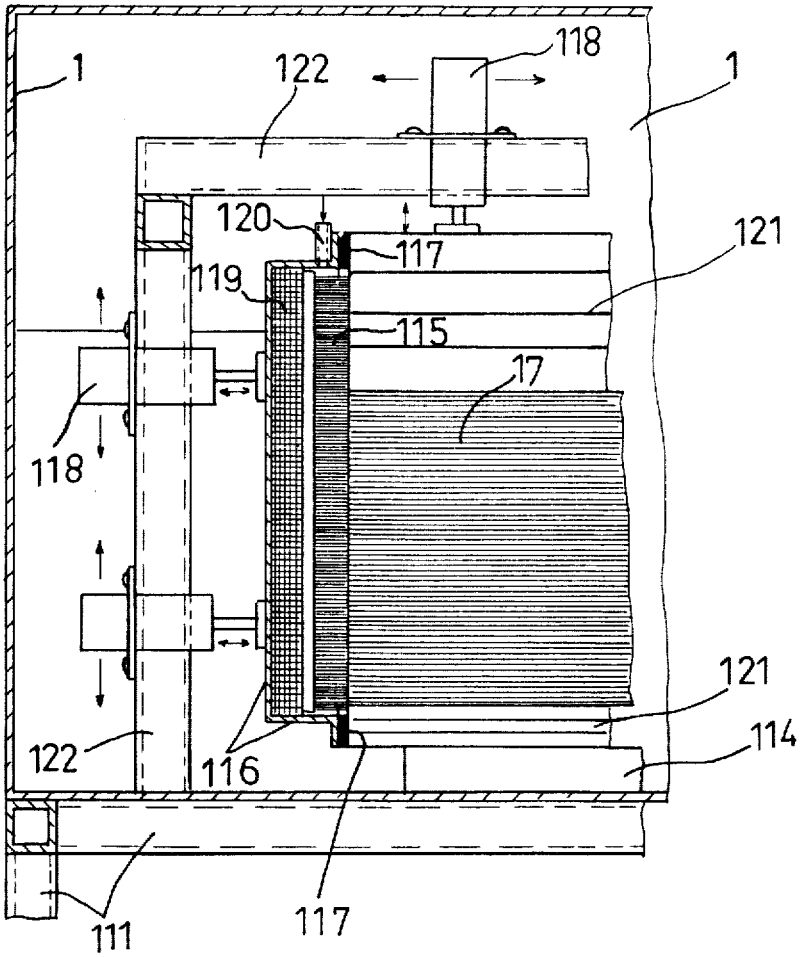
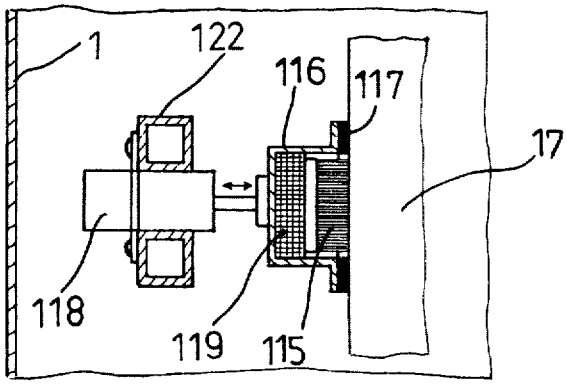
Fig.14

18
131
17
138
133
135
136
137
134
114
2
132
111

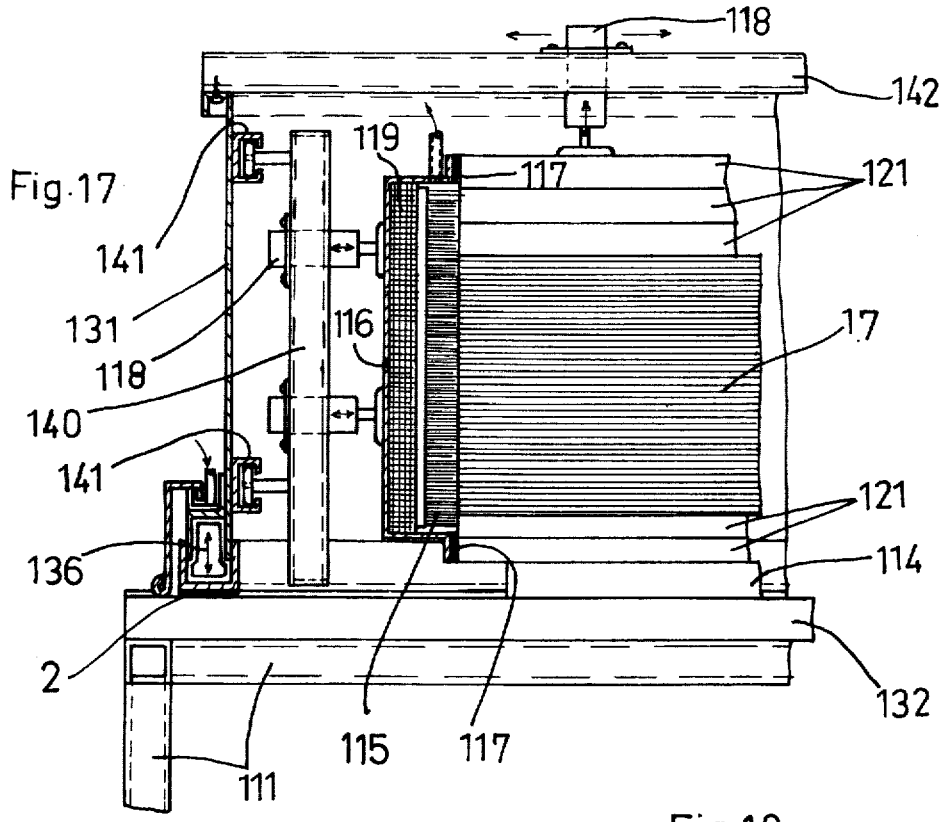
Fig.17
Fig.18
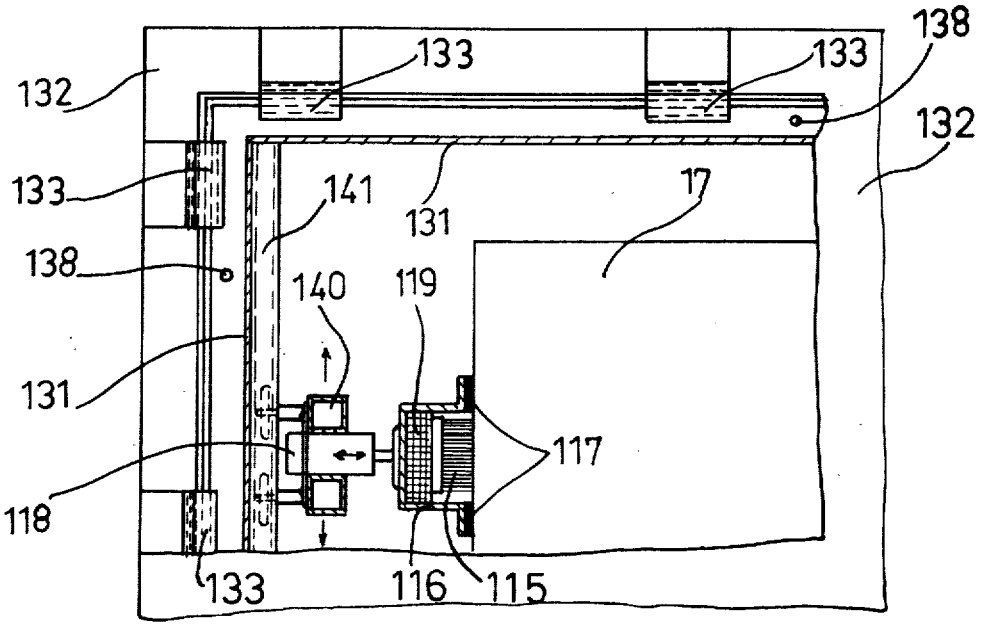

ELECTROPLATING OF THE CUT EDGES OF SHEET METAL PANELS

Matter enclosed in heavy brackets [ ] appears in the original patent but forms no part of this reissue specification; matter printed in italics indicates the additions made by reissue.

This is a continuation of application Ser. No. 204,390, filed Dec. 2, 1971, which in turn is a continuation application of Ser. No. 835,116, filed June 20, 1969, and bearing the same title both now abandoned.

BACKGROUND OF THE INVENTION

For treatment, sheet metal panels are firstly cut to size, then shaped by bending, pressing, or the like to the form desired, and connected to other compounds. The cut edges generally lie at inaccessible places and are protected with difficulty from corrosion. When treating sheet metal panels previously coated with lacquer, synthetic substances or synthetic foils or other rust protective materials, unprotected cut edges are formed when cutting these panels to shape. When using such sheet metal panels in the construction of car bodies, boats, wagons, facades of buildings, wall units, kitchen or bathroom furniture this lack of protection gives rise to corrosion. It is known, though, to electroplate individual places of work pieces means of manually operated tools, wherein an electrolyte is applied to these places by means of sponges or pieces of felt. This method is, however, uneconomic for the electroplating of the cut edges of sheet metal panels.

The present invention has the object of providing an economic method for the electroplating of the cut edges of sheet metal panels, which is suitable for mass production.

BRIEF SUMMARY OF THE INVENTION

According to the invention, for the electroplating of the cut edges of sheet metal panels placed one on top of the others in a pile at least one face to be electroplated of the pile is brought into contact with the electrolyte, each sheet metal panel is connected into a direct current circuit and the electroplating is carried out by the piling of sheet metal panels of identical cut a plurality thereof may be electroplated simultaneously. Assuming a thickness of 1 mm. of each sheet metal panel 1000 panels form a pile of 1 m. height which may be electroplated in the usual period of about 25 minutes.

According to a first embodiment, one wall of an electrolyte container is made of an absorbent material such as panels of felt, sponge or foam material, and one face of the pile is pressed against it. When two such electrolyte containers are pressed on opposite faces of the pile, two faces of the pile may be electroplated simultaneously. By the additional provision of strips of absorbent material to said wall the edges of sheet metal panels having punched cut-outs may be electroplated.

According to a second embodiment one wall of the electrolyte container is provided with an opening; part of the pile of sheet metal panels is introduced through said opening, said opening is sealed; the container is filled with the electrolyte; the electrolyte is sucked off and the pile of sheet metal panels is taken out. Thus curved and serrated edges of sheet metal panels may be electroplated. The sealing of the opening may be effected by movable wall portions with sealing means or by an annular sleeve with presser means.

According to a third embodiment, the pile of sheet metal panels is completely inserted into an empty electrolyte container, then a casing with contact brushes is pressed in a liquid-light manner on the pile, the container is sealed and electroplating is carried out after filling the container with electrolyte. During the electroplating the casings with the contact brushes may be moved along the pile so that all four faces of a pile may be electroplated in a single operation.

An advantageous apparatus comprises a piling plate for the pile of sheet metal panels, a sealing frame resting on said piling plate, removable side walls of the container engaging in the sealing frame, and attachment means which hold the frame for the side walls of the container on said piling. This apparatus may be used not only for the electroplating itself, but also for preceding cleansing baths and/or subsequent treatment baths, so that the sheet metal panels need to be piled once only.

BRIEF DESCRIPTION OF SEVERAL VIEWS OF THE DRAWING

Several embodiments are illustrated in the accompanying drawings by way of example, wherein:

FIG. 13 is a partial longitudinal section of said container.

FIG. 14 is a partial sectional plan view thereof showing contact brushes.

FIG. 17 is partial longitudinal section of that container and

FIG. 18 is a partial plan view in section thereof.

DETAILED DESCRIPTION OF THE INVENTION

Figure 1:
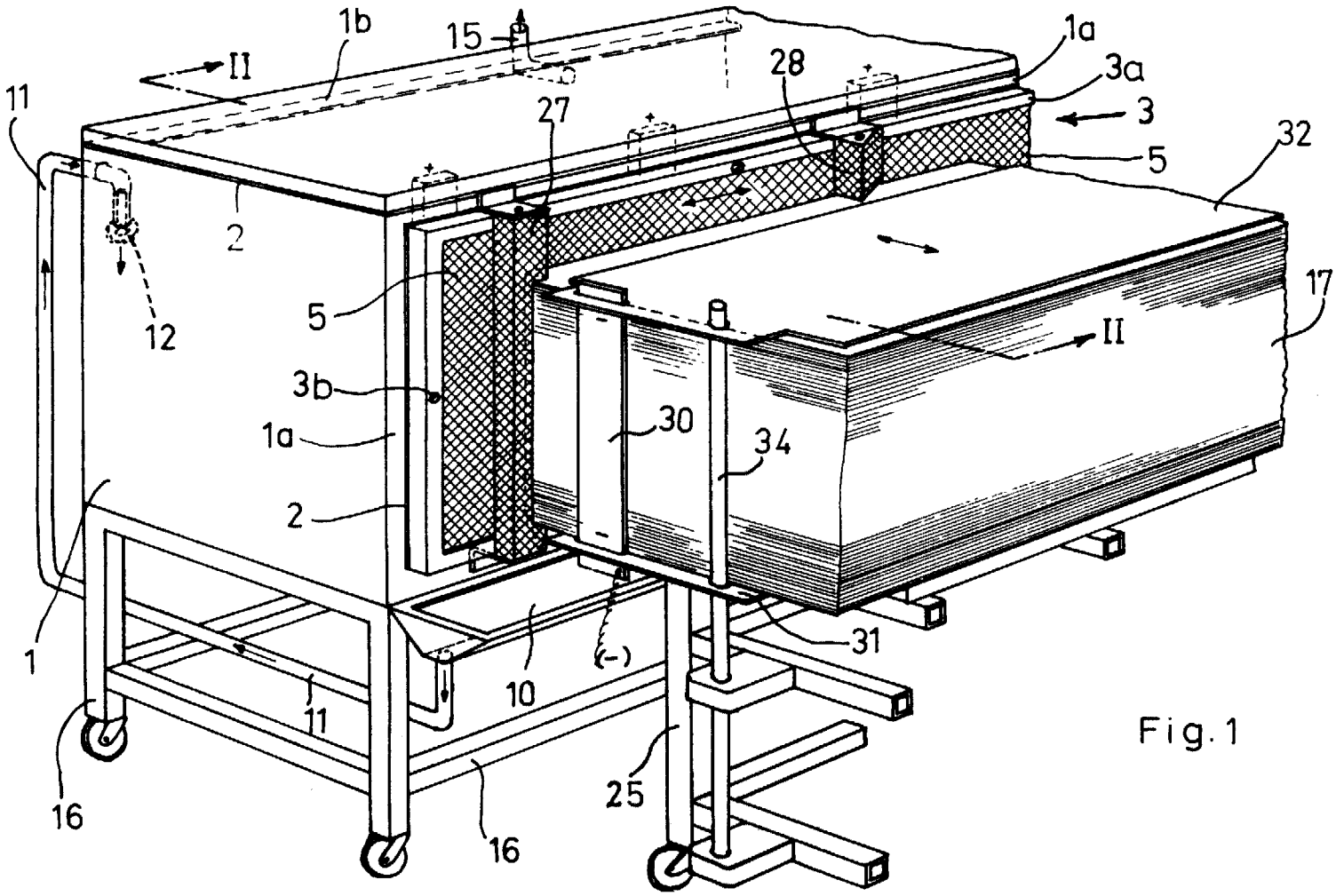
FIG. 1 is a perspective view of an electroplating apparatus for a pile of sheet metal panels cut to shape contacting an absorbent wall of an electrolyte container.
Figure 2:
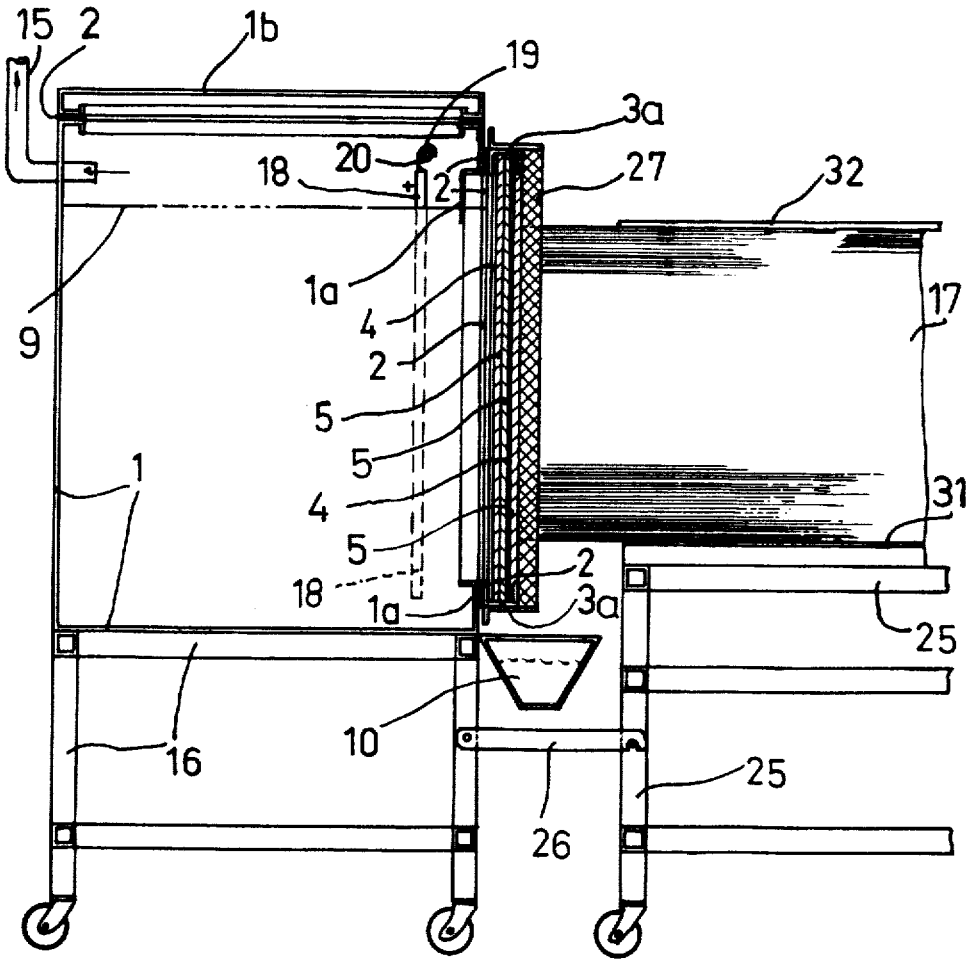
FIG. 2 is a sectional elevation on the line II—II of FIG. 1.

Referring to FIGS. 1 to 4, a trolley 16 carries an electrolyte container 1. The latter has a lid 1b, which rests on the frame of the container in an air-tight manner by means of a rubber seal 2. The front wall 1a of the container is constructed as an absorbent panel 3. On the inside a frame 3a composed of U-sections firstly a wire netting 4 (FIG. 2), then two panels 5 of absorbent material, a further wire netting 4 and a further absorbent panel 5 are inserted. These panels may consist of felt, sponge or foam material, and may have varying degrees of permeability to liquid or may be composed of separate horizontal strips, the permeability of which diminishes downwardly. The frame 3a is held by screws 3b on a longitudinal container wall, with a seal 2a interposed. Electrolyte dripping off the wall 3 is collected in a trough 10 and is returned by a wall pipe line 11 to the top of the container 1. In order to keep the electrolyte level 9 steady, the end of the pipe line 11 is provided with a float valve 12 (FIG. 4); a valve seat 12a thereof rests the cone of a float 12b which is guided by a stem 12c in a holder 11b. A further pipe line 15 leads to a suction plant, so that electrolyte is automatically sucked in, when the level 9 drops Anode metal sheets 18 are suspended by hooks 19 on horizontal conductor bars 20. These bars 20 rest on semicircular brackets 21.

The sheet metal panels cut to shape and to be electroplated are superimposed upon each other in a pile 17 and are held by a lower holder plate 31, an upper holder plate 32 and by abutment rods 34, which are pushed through the lateral projections of said holder plates. These lateral projections may be articulated pivotally on all edges of the holder plates, in order to make all faces of the pile in turn accessible to electroplating. The sheet metal panels, which are preferably coated with synthetic material, lacquer or other insulating materials are to be connected to the cathode of a direct current source. For this purpose contact strips 30 are provided, e.g. brushes of copper wire, which may be mounted in slots of the said projections of the holder plates. For formation of intensive contacts they may be pressed on by springs or vibratory electromagnets.

The pile of sheet metal panels rests on a trolley 25 and is held against the permeable wall 3 by means of hooks 26. For intensive contact with the cut edges small oscillations may be imparted by means of electromagnets energised by alternating current to the permeable wall which bears on rubber seals. If desired the electrolyte container may be movable to-and-fro on rails along said pile.

Preferably acidic electrolytes or electrolytes cyanide electrolyes are to be used which produce a 100% yield of current. When electrolytes are used wherein gaseous hydrogen is developed at the cathode, the surfaces of the lateral wall panels are preferably formed with vertical corrugated troughs and ridges, so that the hydrogen gas can escape through the troughs. The frame 3a, is to be moved so that all parts of the faces of the pile come into contact with the electrolyte.

The electroplating of the cut edges presupposes their previous cleansing from adhering particles derived e.g. from their casings as well as from oil. This cleansing may be effected by a device comprising cleansing brush bars movable in the longitudinal direction of the cut edges, which bars may at the same time spray water containing suitable chemicals against the face of the pile. These cleansing brush bars may be arranged at short intervals from each other and be actuated by a motor to perform reciprocating movements in unison. After electroplating, an after-treatment may be performed, for example by the same device. A further chemical treatment may follow, e.g. chromium plating of the cut edges, which were for example previously zinc-plated. The said device may be mounted on the upper holder plate 32 in the manner of a horizontal sprinkler, or from outside; collector troughs, if desired with pumps, are then provided.

Finally it is also possible to oxidize or anodize the cut edges e.g. of aluminum sheet panels with the aid of said device, by reversing the connections of anode and cathode, i.e. by connecting the pile of aluminum sheet panels to the positive pole of a direct current source.

The cut edges may have punched recesses which may serve for subsequent angularly turning up the margins of the panels. Such cut edges having re-entrant portions are simultaneously electroplated by means of vertical electroplating strips, 27, 28 the cross section of which is complementary to that of the punched recesses of the panels, which strips are for example mounted on the frame 3a, by means of clamps.

These strips carry absorbent material adjacent to said punched cutouts and to the lateral wall panel 3 which material takes over the electrolyte from the lateral wall panel.

Figure 3:
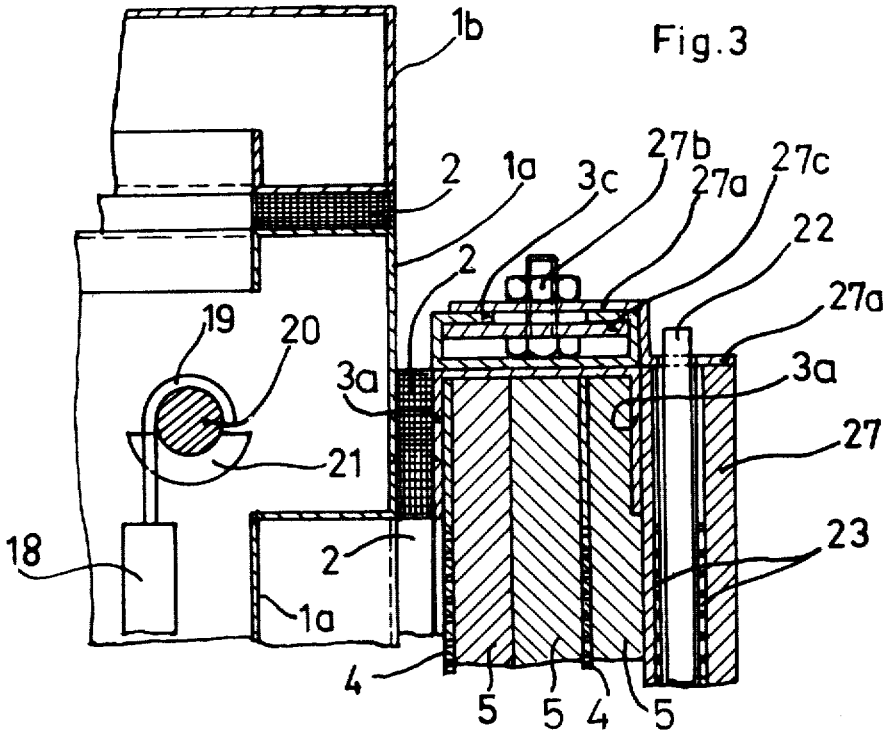
FIG. 3 is a section on a larger scale of the right hand side upper corner, and FIG. 4 of the left hand side upper corner.
Figure 4:
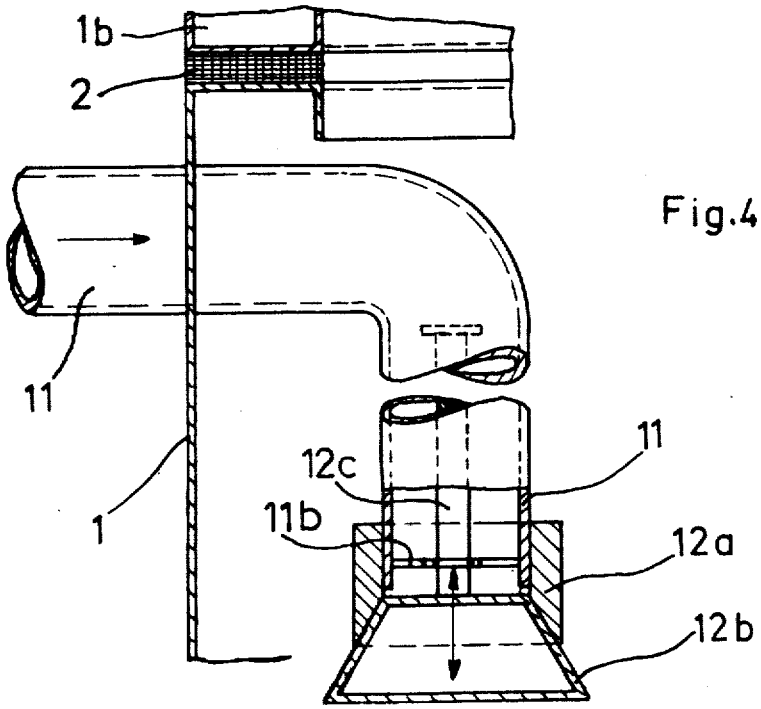
Figure 5:
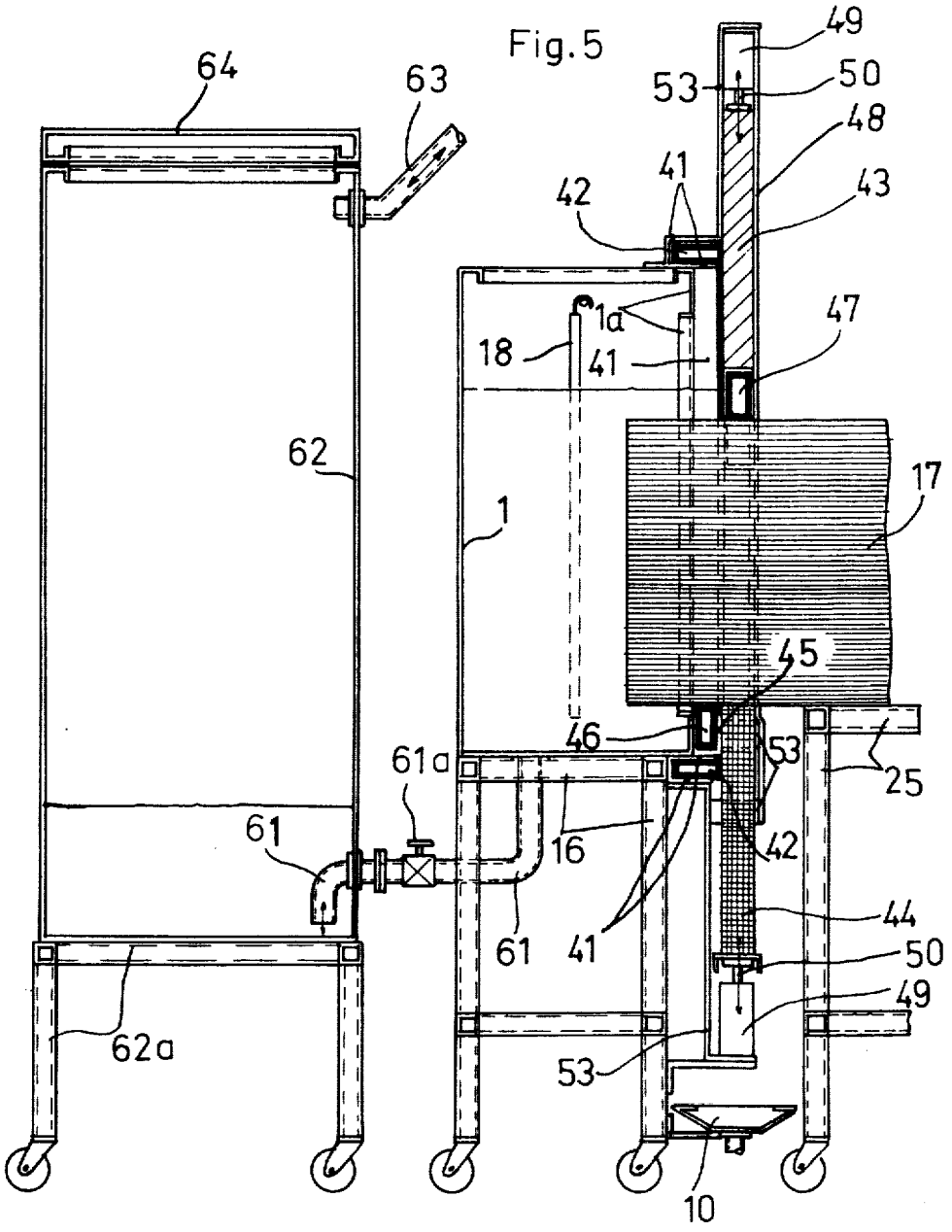
FIG. 5 is a part sectional elevation of a second embodiment with a pile of sheet metal panels partly inserted in an electroplating container.

In a modification illustrated in FIG. 3 the electroplating strips 27 are adjustable by means of Z-shaped brackets 27a, and are mounted exchangeably on C-section rails 3c of the carrier frame by the aid of screws 27b, and clamping members 27c. For large punched recesses the electroplating strips may contain anode rods 22 in their interior, which rods are surrounded in sieve-like tubes 23. Thus the electrolyte may flow about the anode rods, and gases liberated on the anode may rise along the anode.

In a second embodiment according to FIGS. 5 to 11 a pile 17 of sheet metal panels lying on a trolley 25 is introduced partly into an electroplating container through an aperture in the front wall 1a thereof, whereafter the said opening is closed by movable wall portions 43, 44 which are sealed all round the pile of sheet metal panels in a liquid-tight manner. Then electrolyte is forced from a storage container mounted on a trolley 62a and closed by a lid 64 into said electroplating container 1 through a pipe 61 with stopcock 61a by compressed air introduced through a pipe 63.

Figure 6:
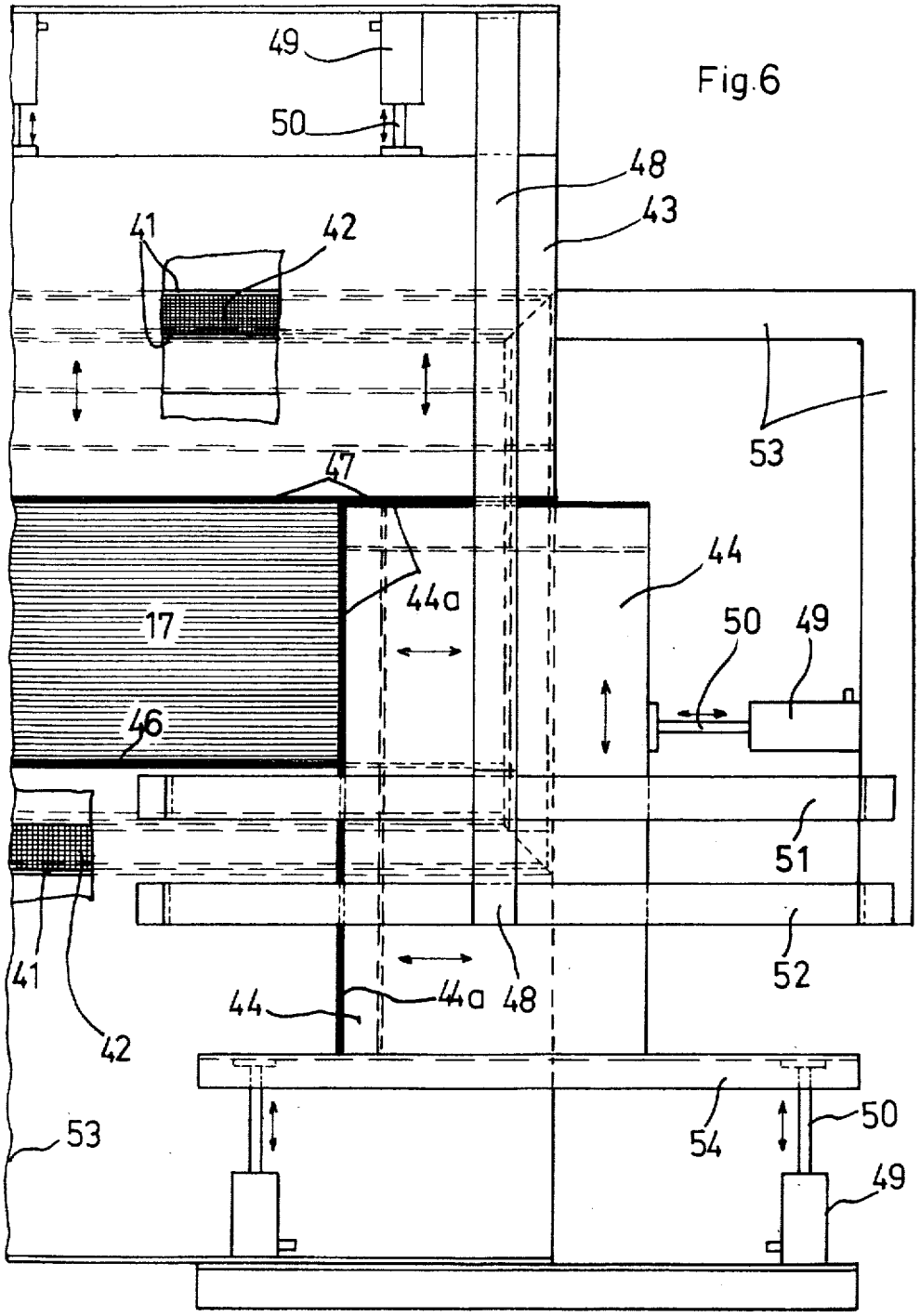
FIG. 6 is a partial front elevation thereof, with sealing walls.

The electroplating container 1 rests on a trolley 16 having a collector trough 10. All round the front wall 1a a frame 41 is arranged which is made of U-section bars. Into said U-sections open in front an endless hose 42 is inserted which hose can be inflated through a valve by compressed air and thus pressed on the movable wall portions. The upper wall portion 43 and the lower wall portion 44 are guided at their backs by a framing 53 on the trolley and on the container, respectively, and at their fronts by vertical rails 48 as well as by horizontal rails 51, 52 and is pressed on the pile 17 by a pressure cylinder 49 with piston rod 50, if desired with rails 54 interposed. These wall portions carry on their front edges directed towards the pile of sheet metal panels inflatable hoses 47 and sealing means e.g. rubber strips 44a (FIG. 6). On the underside of the pile of sheet metal panels and above the frame 41 composed of U-sections an upwardly open U-section 45 with an inflatable hose 46 is arranged for sealing. Thereby the pile of sheet metal panels as well as the container can be sealed relative to the walls. Anode metal sheets 18 are suspended in the container.

Figure 7:
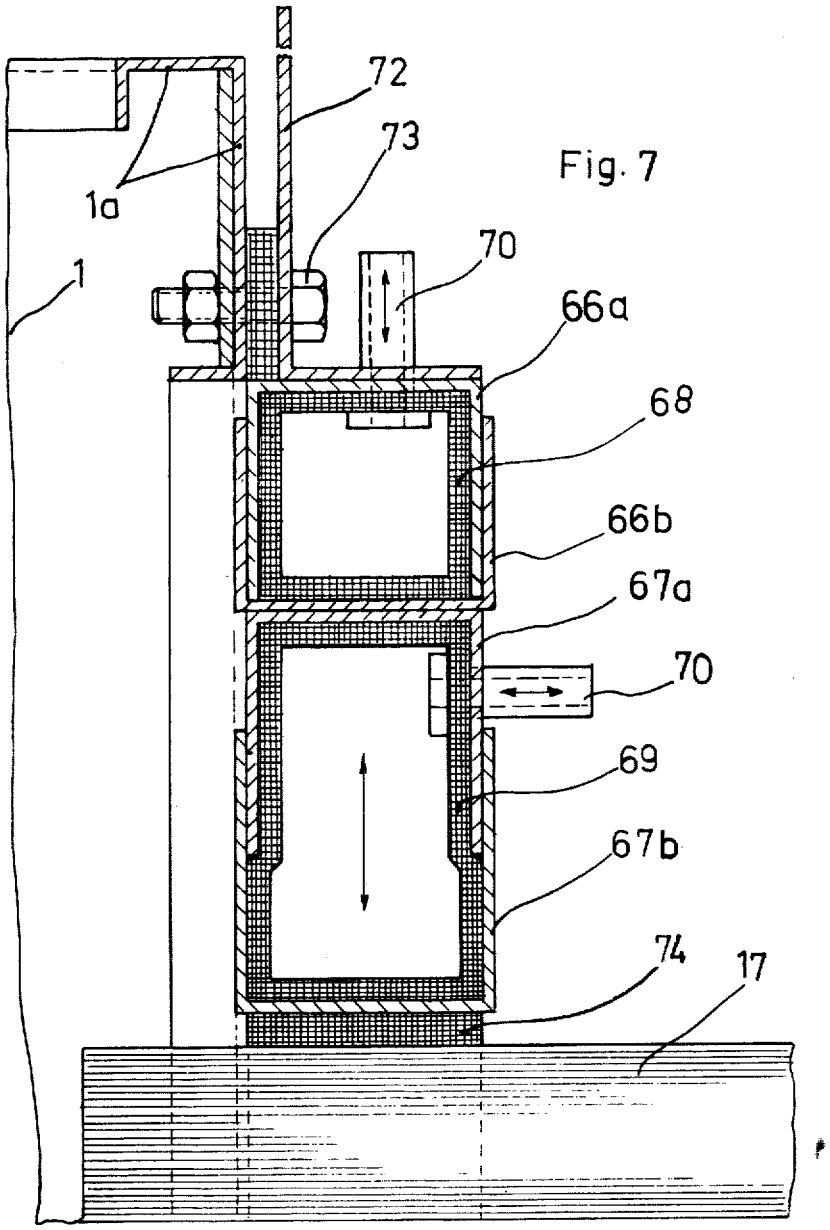
FIG. 7 is a section on a larger scale of a sealing wall.

These wall portions may also be enlargeable. In accordance with FIG. 7 the aperture of a U-section 66a is overlapped by a second U-section 66b, and in the cavity thus formed a hose 68 is arranged which may be inflated through a port 20 with a valve (not shown). When being inflated, the hose forces the said two U-sections apart which are guided in each other. In FIG. 7 in the first U-section there is arranged a second pair of U-sections 67a, 67b with a hose 69 and port 70 (controlled by a valve not shown). A resilient strip 74 seals the enlargeable wall portion from the pile 17 of sheet metal panels. This wall portion is fixed by the aid of screws 73 to the horizontal leg of an angle section 74, the vertical leg of which has longitudinal slots for the adjustment of its level. These screws force the angle section against the front wall 1a of the electroplating container, with a seal interposed.

In a modification according to the FIGS. 8 to 11 a rubber sleeve 101 is used for sealing the pile 17 of sheet metal panels, which rests on a trolley 25, relative to container 1a, which sleeve is clamped at its outer margin to the inside of the front wall 1a, and with its inner margin turned outwardly is applied all round the pile of sheet metal panels. For sealing, presser bars 105 with inserted rubber strips 106 bear on the inner margin thereof, which bars may be pressed on the pile of sheet metal panels by pressure cylinders 82 with piston rods 83. These pressure cylinders are mounted on a bracket 108 fixed to the electroplating container 1 and to the trolley 16. On the outside of the inner margin of the said sleeve and opposite the corners of the pile of sheet metal panels cables 110 are attached which are passed over rollers 110a to reels (not shown). By a pull on said cables the aperture of the resilient sleeve is enlarged so that the pile of sheet metal panels may be pushed in. For perfect contact of said sleeve with the corners of the pile, presser corner pieces 107 and extensible bars 105a may be provided, which are adaptable to the actual cross-section of the pile of sheet metal panels and may be pressed on the same by pressure cylinders 82 and piston rods 83.

Figure 10:
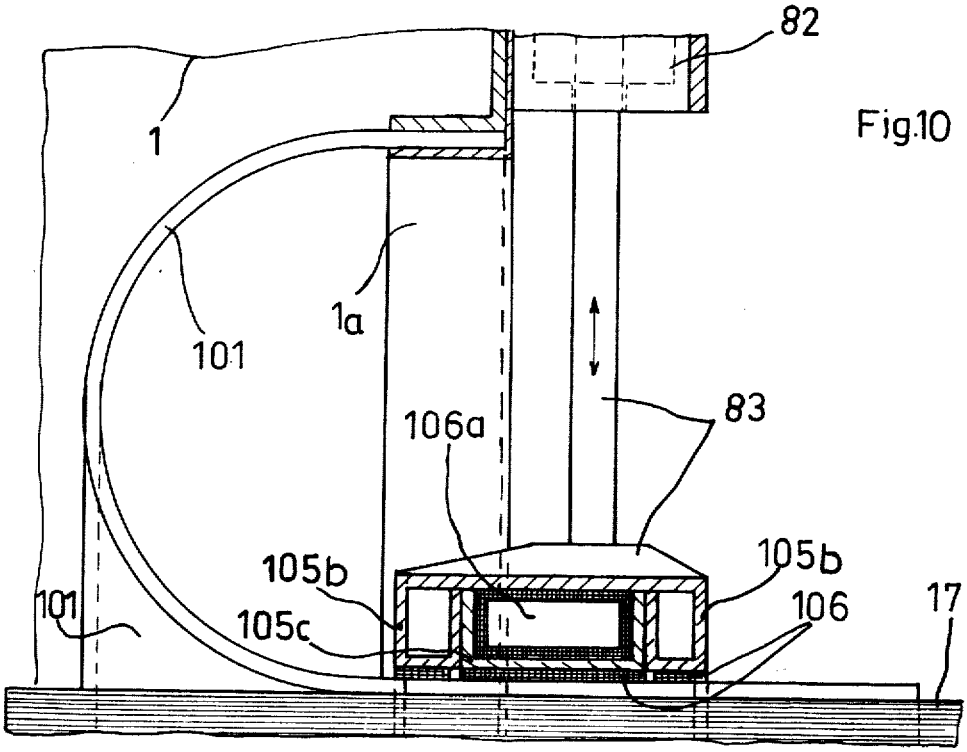
FIG. 10 shows in section on an enlarged scale a pressure device for said sleeve.

In accordance with FIG. 10 these presser bars 105b may have a U-shaped cross section with box-profile flanges. In the aperture of the U-section an inflatable hose 106a and a further U-section bar 105c are inserted. The faces of the bars 105b, 105c contacting said sleeve carry resilient strips 106.

Figure 8:
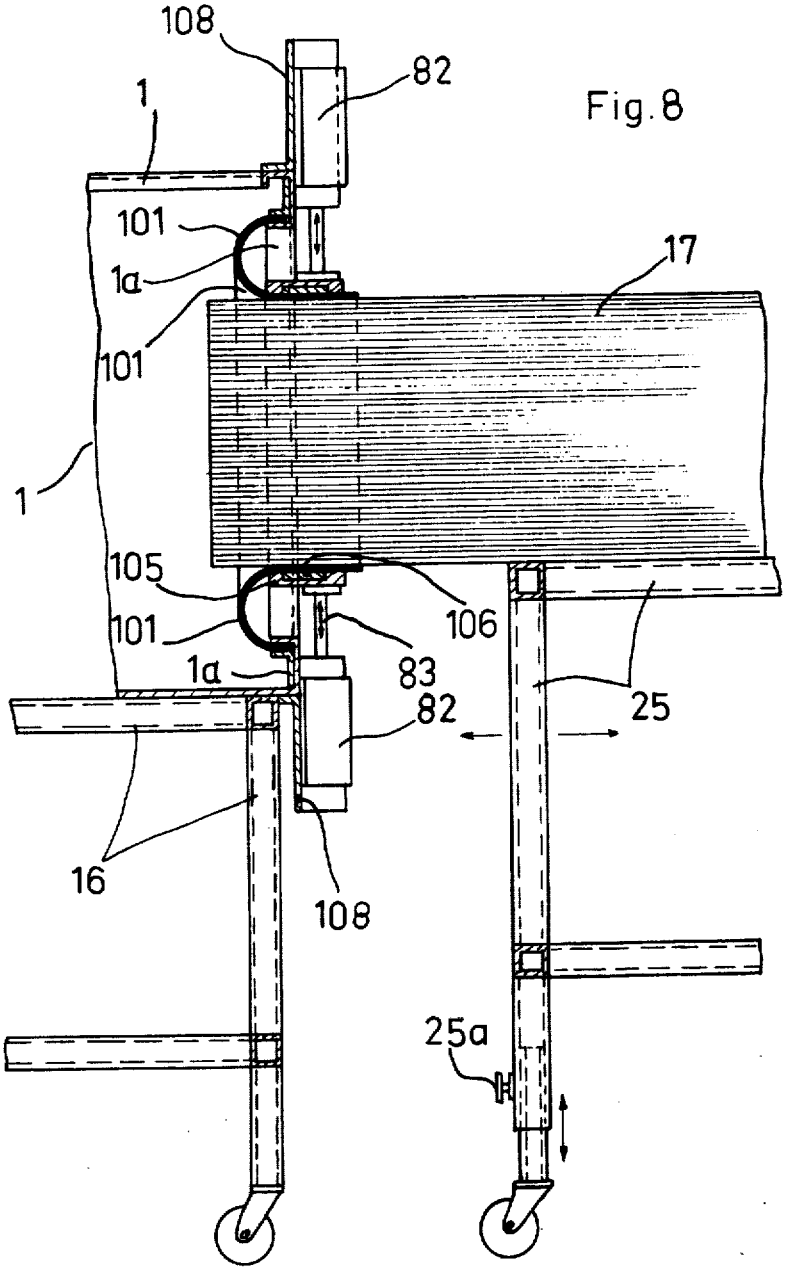
FIG. 8 shows in section a modification with a sealing sleeve embracing the pile of sheet metal panels.
Figure 9:
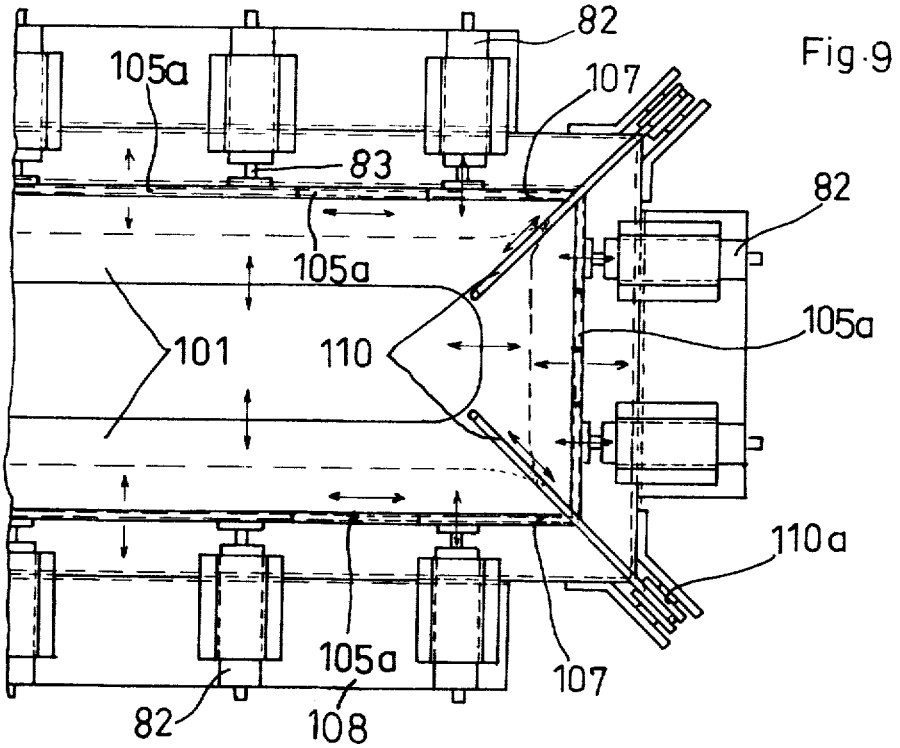
FIG. 9 is a front elevation to FIG. 8 with the pile of sheet metal panels ommitted.
Figure 11:
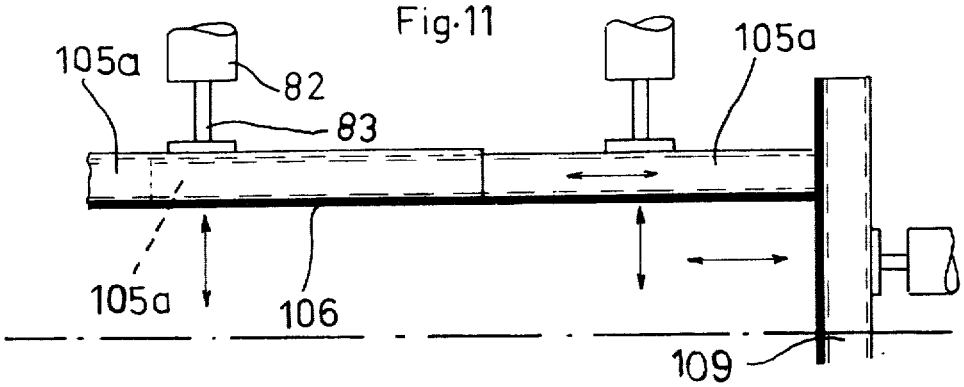
FIG. 11 is a partial view of extensible presser rails.

In FIG. 11 extensible bars 105a are provided at the upper face and underside of the pile of sheet metal panels forming horizontal seals, and presser bars 109 are arranged at the vertical faces of said pile, the length of which exceeds the maximum height of said pile and which, when being pressed on by pressure cylinders 82 and piston rods 83, at the same time push the horizontal presser bars towards each other. The pressure applied by the pressure cylinders also compresses the pile of sheet metal panels in such a manner that any penetration of electrolyte between said metal panels is prevented. The trolley 25 carrying said pile has legs, which are extensible, carry castors and are fixable by means of screws 25a (FIG. 8).

In a third embodiment the pile of sheet metal panels is inserted as a whole into the electrolyte containers. The apparatus according to FIGS. 12 to 14 comprises likewise a storage container 62 with an air tight lid 64 and resting on a trolley 62a. On top a pipe 62 for the application of suction or air pressure is arranged, and on the bottom a pipe 63 with stopcock 61a leads to the electroplating container 1 which rests on a trolley 111. The front wall of the container has an opening, which can be closed in a liquid-tight manner by a lid 112 and screws.

When the electrolyte is sucked off and the lid is opened, the pile 17 of sheet metal panels is inserted on a support base 114. For this purpose, the sheet metal panels are placed on a bottom plate 121 e.g. wood, and are covered on top by an identical top plate 121. In the container there is provided a U-shaped frame 122, which straddles the pile of sheet metal panels which is pushed into it. This frame carries upper pressure cylinders 118 for compressing the said pile. On the sides of the frame further pressure cylinders 118 are arranged for pressing the contact brushes 115 on the said pile (FIG. 13). Around the said contact brushes an electrically insulating casing 116 is placed, which is sealed by rubber strips 117 against said pile. The flexible backs of the said contact brushes contact a soft rubber mass 119 which fills the remainder of the cavity of said casing.

Figure 12:
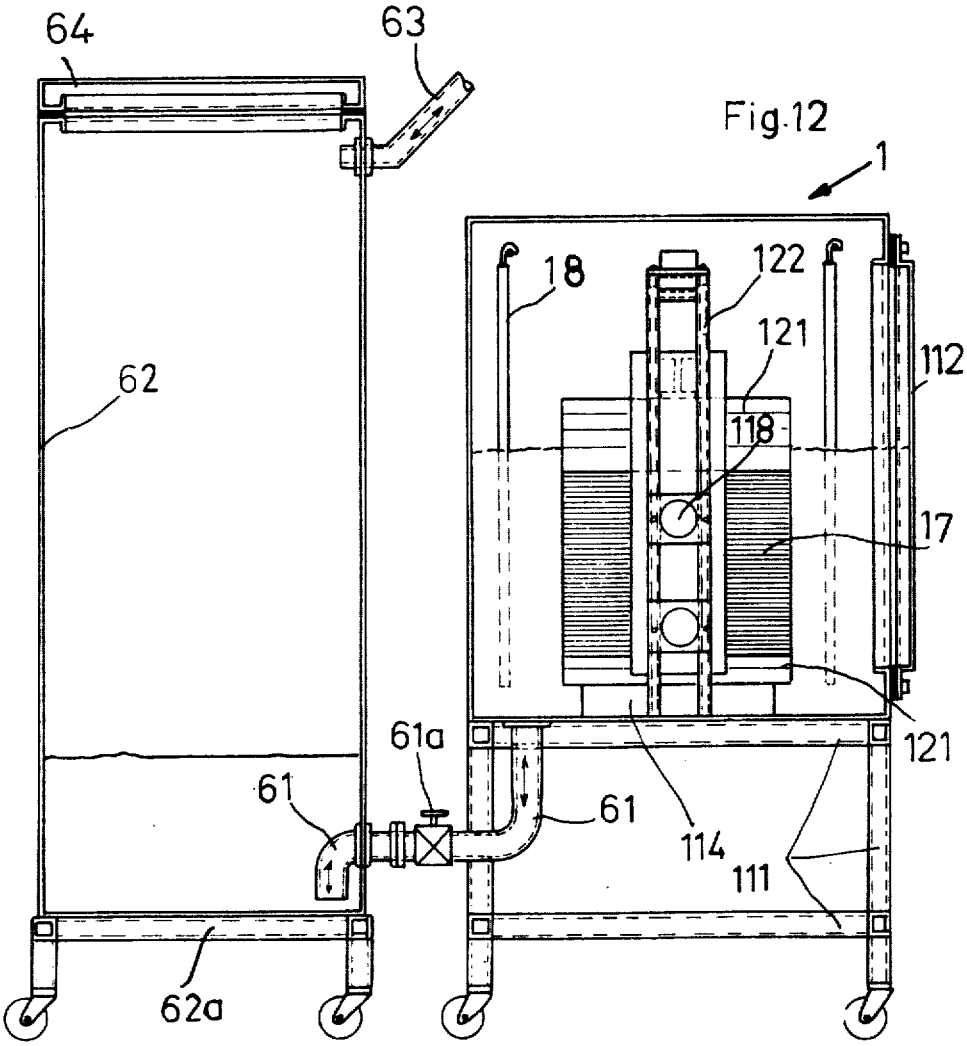
FIG. 12 is a sectional elevation of a third embodiment, wherein the pile of sheet metal panels as a whole is insertable into the container through a detachable wall.

Additionally, compressed air may be introduced through a port 120 controlled by a valve (not shown) arranged on top of said contact brush casing in order to prevent the entry of electrolyte. The said contact brushes may be oscillated by alternating current supplied to electromagnets (not shown). Opposite the faces to be electroplated of said pile, anode metal sheets 18 are suspended (FIG. 12).

Figure 15:
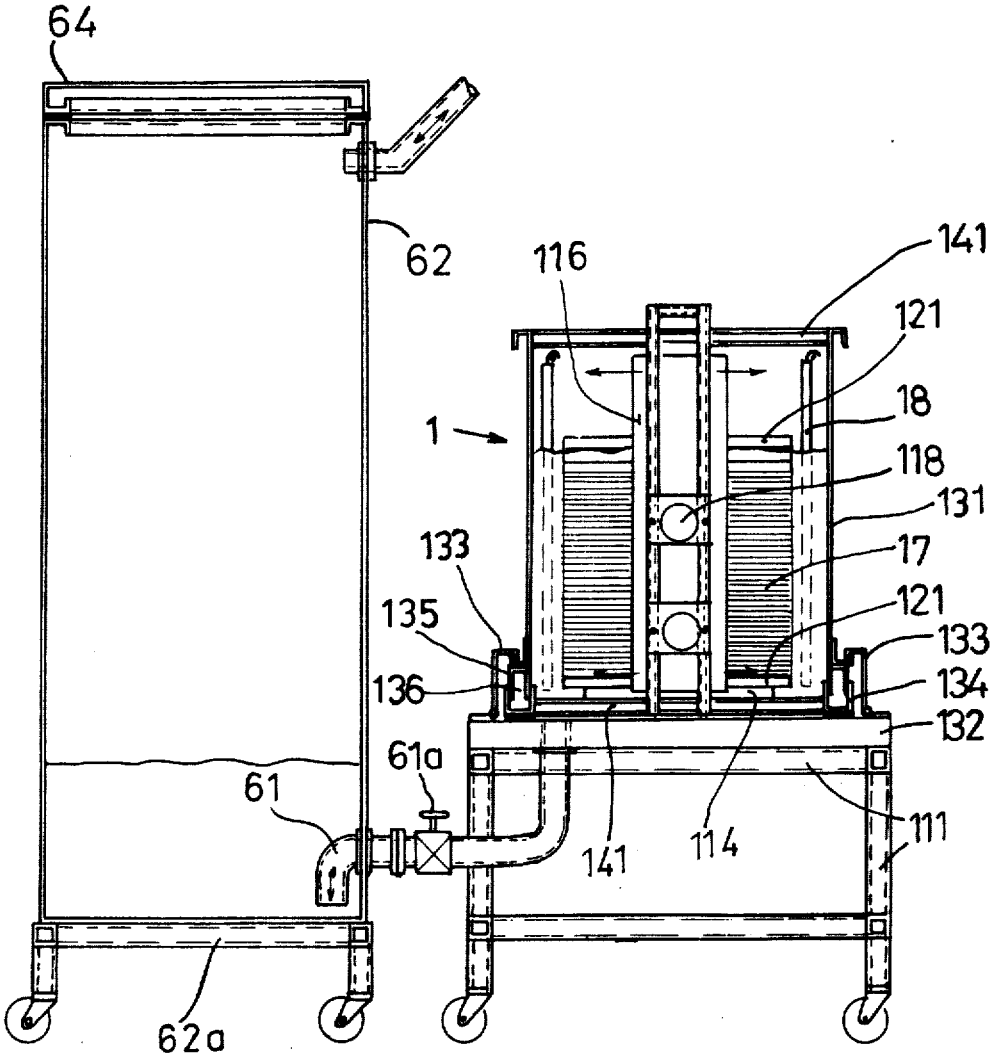
FIG. 15 is a sectional elevation of a modification having a dismountable container.
Figure 16:
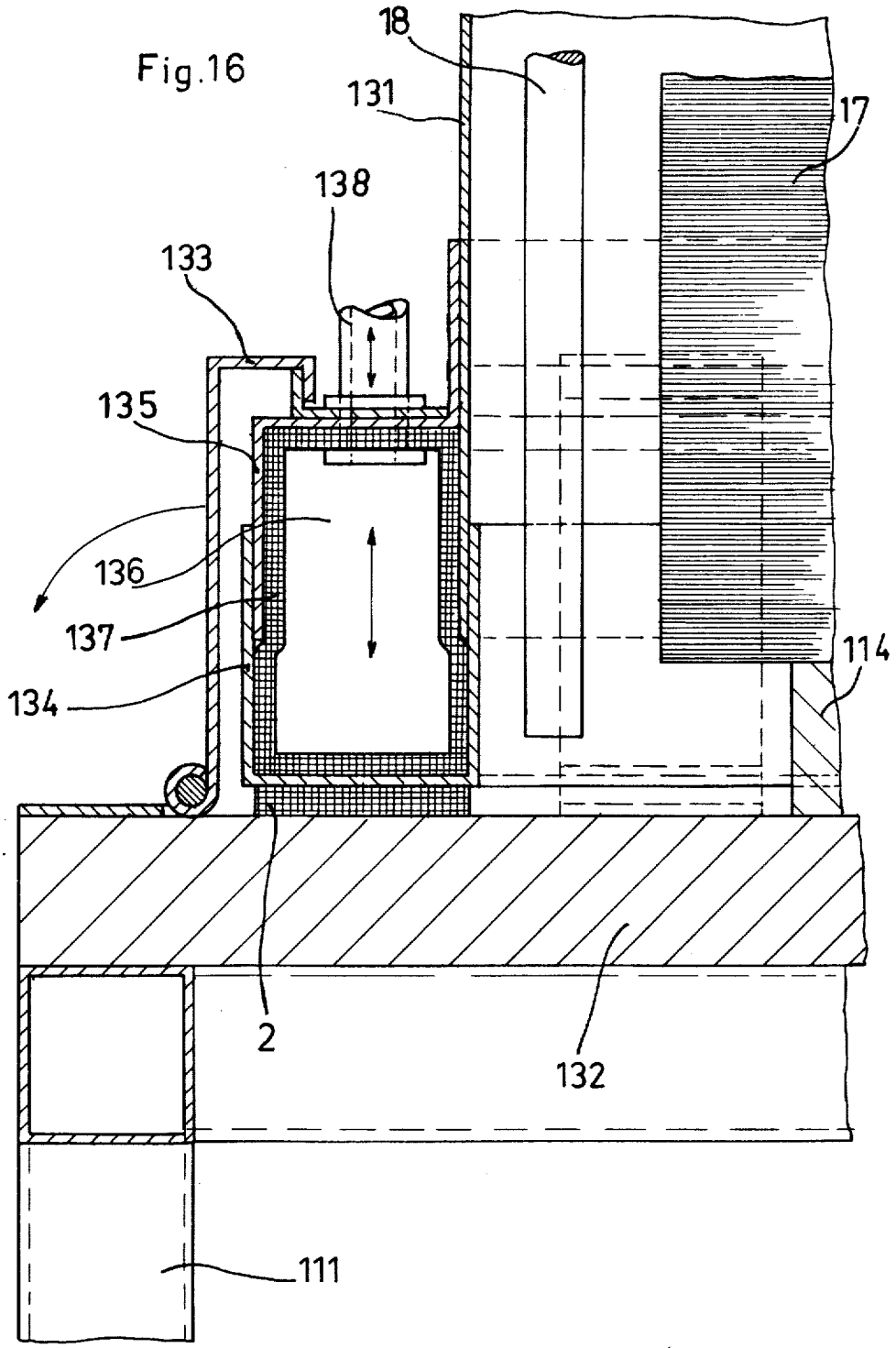
FIG. 16 is a section on an enlarged scale of the mounting and sealing of a wall thereof.

In the embodiment according to FIGS. 15 to 18 the electroplating container 1 is dismountable in order to avoid difficulties when inserting the heavy pile of sheet metal panels. On a trolley 111 a piling table 132 is arranged, on the carrier strips 114 of which firstly a lower cover plate 121, then the sheet metal panels out to shape are placed in a pile 17 covered by one or more top plates 121. For the purpose of sealing, a presser frame 134 (FIG. 16) is placed on the piling plate around the said pile, which frame consists in a U-section open inwardly and carries on its underside a seal 2b. Into said presser frame four side walls 131 of the container are inserted which form a frame open on top and bottom. On their lower edge, Z-profile sections 135 are attached, which together with the side walls form a cavity opening downwardly for the accomodation of a hose 137. The frame formed by the side walls is held by attachment means e.g. by clamps 133, which are mounted pivotably on the piling plate. By inflating the hose through a port 138 controlled by a valve (not shown) the side walls are sealed against the pilings plate, and the electroplating container is ready for being filled with electrolyte from the storage container 62 through the pipe 61 (FIG. 15). Anode metal sheets 18 are to be suspended in said container. For the supply of current to the edges of the sheet metal panels, contact brushes 115 are provided in the casings 116 (FIG. 17). These casings press the contact brushes against said pile through soft rubber layers 119 and are sealed by rubber strips 117 against said pile, being pressed on said pile by pressure cylinders 118. These pressure cylinders are arranged on vertical hollow sections 140 which are mounted slidably on top and bottom in horizontal guides 141 attached to the side walls by the aid of rollers so that they can be moved during the electroplating. By a slow movement of the contact brushes all the cut edges of the panels are successively brought into contact with the electrolyte whereby all faces of the said pile are electroplated in one operation.

On the upper edges of the side walls a transverse beam 142 is mounted, which carries the pressure cylinders 118 for compressing the pile of sheet metal panels.

By means of the apparatus described the edges of the sheet metal panels of any metal, coated with any layers e.g. lacquer, synthetic substances or metallic coatings or platings, may be electroplated. When the panels have electrically conductive coatings, the penetration of electrolyte between the sheet metal panels is to be prevented by the interposition of tapes self-adhesive on both sides or of protective foils between the margins of the panels.

What is claimed:

1. In a method of electroplating the cut edges of sheet metal panels, the improvement which consists in forming a pile of said panels, inserting one side of said pile through an opening in the wall of an electroplating container, said opening being sealed in a liquid-tight manner around said pile, introducing the electrolyte into said container so as to cause contact of the cut edges of said pile of sheet metal panels with the electrolyte, connecting each panel of said pile with an electroplating current source, performing electroplating of said cut edges, removing the electrolyte from said container, and withdrawing the pile with the electroplated cut edges from the container.

2. The method of claim 1, in which the sheet metal panels are aluminum sheet panels and the cut edges thereof are oxidized by connecting each aluminum sheet panel of the pile to the positive pole of a direct current source.

3. The method of claim 1, in which the sheet metal panels in the pile are separated from each other by the interposition of a non-conductive layer.

4. In a method of electroplating the cut edges of sheet metal panels, the improvement which comprises the steps of forming a pile of said panels, each panel being separated from the adjacent panel by an electrically non-conductive layer, its edge portions on at least one side of the panel being substantially aligned with the edge portions of the panels, bringing at least one side face of cut edges of said pile in contact with the electroplating electrolyte, connecting each panel to an electroplating current source, and electroplating the cut edges of each panel.

5. The method of claim 4, in which at least one side face of the pile of cut-edged sheet metal panels is brought in contact with a wall of the electrolyte container, said wall consisting of absorbent material having absorbed therein the electrolyte, connecting each panel to an electroplating current source, and electroplating the cut edges of each panel.

6. The method of claim 4, in which at least one side face of the pile of cut-edged sheet metal panels is brought in contact with the electroplating electrolyte by inserting said pile through an opening in a wall of an electroplating container, sealing said opening around said pile, filling the container with the electroplating electrolyte to contact the cut edges of the panels therewith, connecting each panel to an electroplating current source, electroplating the cut edges of each panel, removing the electrolyte from the container, and removing the pile of sheet metal panels with electroplated edges from the container.

7. The method of claim 4, in which the pile of cutedged sheet metal panels is placed into an electroplating container, movable insulating casings containing contact brushes are pressed in a liquid-tight manner on the side faces of said pile to connect each panel with an electroplating current source, filling the container with the electroplating electrolyte to contact the cut edges of the panels, electroplating the cut edges of each panel, removing the electrolyte from the container, and removing the pile of sheet metal panels with electroplated cut edges from the container.

8. The method of claim 7, in which the insulating casings containing the contact brushes are moved along the side faces of the panel so as to expose the cut edges to the electroplating electrolyte and to completely electroplate said cut edges.

9. The method of claim 4, in which the sheet metal panel is a panel coated with an electrically non-conductive layer.

10. The method of claim 4, in which non-conductive layers are interposed between the sheet metal panels at least at their margins to prevent conductive contact of the panels with each other and penetration of the electrolyte between the panels.

11. The method of claim 4 in which the sheet metal panels are aluminum sheet panels and the cut edges thereof are oxidized by connecting each aluminum sheet panel of the pile to the positive pole of a direct current source.

12. The method of claim 7, in which the pile of cutedged sheet metal panels and the movable insulating casings containing contact brushes pressed on the side faces of said pile are placed into the electroplating container filled with the electroplating electrolyte and in which the electroplated pile with the insulating casings is removed from the electrolytefilled container after electroplating the cut edges.

13. In a method of electroplating the cut edges of sheet metal panels, the improvement which comprises the steps of forming a pile of said panels, the edge portions on at least one side of said panels being substantially aligned, bringing said one side of said cut edges of said pile into contact with the electroplating electrolyte, maintaining sub-atmospheric pressure above the electrolyte level, and connecting each panel to an electroplating current source thereby electroplating the cut edges of each panel.

14. The method of claim 13, in which said at least one side face of the pile of cut-edged sheet metal panels is brought in contact with a wall of the electrolyte container consisting of absorbent material having absorbed therein the electrolyte.

15. The method of claim 13, in which said at least one side face of the pile of cut-edged sheet metal panels is brought in contact with the electroplating electrolyte by inserting said one side face of said pile through an opening in a wall of an electroplating container, and sealing said opening around said pile.

16. The method of claim 13, in which the entire pile of cut-edged sheet metal panels is placed into an electroplating container, and wherein movable contact brushes are pressed against the side faces of said pile to connect each panel with said electroplating current source.

* * * * *